United States Patent
Zheltov et al.

(10) Patent No.: US 7,836,447 B2
(45) Date of Patent: Nov. 16, 2010

(54) METHOD OF EFFICIENT PERFORMANCE MONITORING FOR SYMMETRIC MULTI-THREADING SYSTEMS

(75) Inventors: Sergey Nikolaevich Zheltov, Nizhny Novgorod (RU); Stanislav Viktorovich Bratanov, Nizhny Novgorod (RU); Roman Alexeevich Belenov, Nizhny Novgorod (RU); Alexander Nikolaevich Knyazev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1218 days.

(21) Appl. No.: 10/564,568

(22) PCT Filed: Jul. 15, 2003

(86) PCT No.: PCT/RU03/00306

§ 371 (c)(1),
(2), (4) Date: Apr. 13, 2006

(87) PCT Pub. No.: WO2005/006205

PCT Pub. Date: Jan. 20, 2005

(65) Prior Publication Data

US 2006/0235648 A1    Oct. 19, 2006

(51) Int. Cl.
G06F 9/46 (2006.01)
G06F 11/00 (2006.01)
(52) U.S. Cl. .................. 718/100; 718/102; 714/1; 714/30; 714/33; 714/37; 714/47
(58) Field of Classification Search .............. 718/102; 709/224
See application file for complete search history.

(56) References Cited

U.S. PATENT DOCUMENTS 4,897,842 A * 1/1990 Herz et al. ............... 714/732
5,537,331 A * 7/1996 Shinonaga ............... 716/4

(Continued)

FOREIGN PATENT DOCUMENTS

RU    2121709 C1    11/1998

(Continued)

OTHER PUBLICATIONS

PCT International Search Report; International Application No. PCT/RU 2003/000306; Filing Date: Jul. 15, 2003.

*Primary Examiner*—Li B Zhen
*Assistant Examiner*—Abdullah Al Kawsar
(74) *Attorney, Agent, or Firm*—Glen Kellett; Barnes & Thornburg, LLP

(57) ABSTRACT

Efficient performance monitoring for symmetric multi-threading systems is applicable to systems that have limited performance monitoring resources and enables efficient resource sharing on a per-execution unit basis. The performance monitoring unit being shared is programmed to reset its counter and to start performance monitoring operation if there is only one execution unit requesting this operation. In case there are several requests pending, an attempt is made to program the performance monitoring unit to collect performance data for a subset of execution units the hardware is capable to support. Upon a request to stop performance monitoring operation the previously allocated indicator may be removed, and the performance monitoring unit may be programmed to stop operating if there are no more active or pending requests. In case the performance monitoring was inactive for the current execution unit, this request may be discarded, and no performance data may be returned.

36 Claims, 3 Drawing Sheets

U.S. PATENT DOCUMENTS

| | | | |
|---|---|---|---|
| 5,657,438 A * | 8/1997 | Wygodny et al. | 714/1 |
| 5,774,724 A * | 6/1998 | Heisch | 717/129 |
| 5,911,041 A * | 6/1999 | Schaffer | 714/38 |
| 6,069,875 A | 5/2000 | Miller et al. | |
| 6,134,675 A * | 10/2000 | Raina | 714/37 |
| 6,754,850 B2 * | 6/2004 | Grey et al. | 714/33 |
| 6,996,489 B2 * | 2/2006 | Sakaguchi | 702/110 |
| 7,343,520 B2 * | 3/2008 | Kramer et al. | 714/30 |
| 2002/0083387 A1 * | 6/2002 | Miner et al. | 714/726 |
| 2002/0110091 A1 * | 8/2002 | Rosborough et al. | 370/252 |
| 2003/0005179 A1 * | 1/2003 | Schmit et al. | 709/328 |
| 2003/0005380 A1 * | 1/2003 | Nguyen et al. | 714/736 |
| 2003/0012136 A1 | 1/2003 | Walles | |
| 2003/0126515 A1 * | 7/2003 | Abdo | 714/43 |
| 2004/0083072 A1 * | 4/2004 | Roth et al. | 702/117 |
| 2004/0215602 A1 * | 10/2004 | Cioccarelli | 707/3 |
| 2004/0215780 A1 * | 10/2004 | Kawato | 709/226 |

FOREIGN PATENT DOCUMENTS

| | | |
|---|---|---|
| WO | WO 01/20918 A2 | 3/2001 |
| WO | WO 2005/006205 A1 | 1/2005 |

* cited by examiner

METHOD OF EFFICIENT PERFORMANCE MONITORING FOR SYMMETRIC MULTI-THREADING SYSTEMS

CROSS-REFERENCE TO RELATED APPLICATION

This application is a National Phase application of, and claims priority to, International Application No. PCT/RU2003/000306, filed Jul. 15, 2003, entitled A METHOD OF EFFICIENT PERFORMANCE MONITORING FOR SYMMETRIC MULTI-THREADING SYSTEMS.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to performance measurement techniques and, more specifically, to measurement of performance of an execution thread within a symmetric multi-threading (SMT) system.

2. Description

It is a general practice to increase the computational performance by organizing parallel program execution. There are a number of methods to achieve this, including, but not limited to, out-of-order instruction execution, multiple data operands, shared memory multi-processor systems, distributed computations, and so forth. One of the popular and relatively inexpensive approaches is to combine multiple execution cores within one physical processor, or even provide separate execution state containers and control logic to share multiple processing units of a physical processor. The latter statement is applicable, for example, to the Hyper-Threading technology commercially available from Intel Corporation, which provides better utilization of various execution units incorporated in a processor.

Measurement of a processor's (program's) performance is one of the main tasks to be solved when building an efficient computational system. For single processor systems, performance monitoring is a matter of correctly written software, given that the processor (or other hardware components) provides the necessary resources. The performance monitoring task may be more difficult for SMT systems: performance monitoring hardware support may vary considerably, and the interaction between hardware and software parts of performance monitoring system becomes more complicated.

Possible difficulties that can arise include the lack of performance monitoring resources (e.g., performance counters) to monitor the activity of all processing units (e.g., logical threads or processors) within a physical package, and no hardware support of asynchronous and independent measurements performed on a per-thread (per-logical processor/unit) basis.

Therefore, a need exists for the capability to efficiently monitor the performance of multi-threading systems taking into account the possible lack of hardware resources.

BRIEF DESCRIPTION OF THE DRAWINGS

The features and advantages of the present invention will become apparent from the following detailed description of the present invention in which.

DETAILED DESCRIPTION

Embodiments of the invention described herein may be applicable to performance monitoring conducted on an execution thread basis within a symmetric multi-threading (SMT) system. One embodiment of the present invention may be used in a system built on Intel Corporation's Hyper-Threading (HT) technology to enable effective performance monitoring on a per logical processor basis.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

It is not always possible to provide independent hardware support for simultaneous monitoring of multiple execution threads or logical execution modules (e.g., logical processors for HT). Thus, many useful measurements can be performed for either all execution threads or for a specified subset, depending on a particular hardware implementation. Embodiments of the present invention relate to the case of limited performance monitoring resources and enable quasi-independent measurements for each execution thread or logical execution unit. That is, whenever a thread (logical unit) initiates measurements, the overall performance monitoring results are computed correctly, but the distribution of the results to any particular thread (logical unit) depends on a particular hardware implementation.

The following definitions may be useful in understanding embodiments of the present invention described herein.

A performance monitoring unit is a device (whether external, integrated, or a specific functional block within a primary unit) intended for measuring (monitoring) operational characteristics of a primary device (unit) or system.

An execution thread is a program to be executed by a processing unit (e.g., processor) independently and (if possible) concurrently with other programs, and the state of the processing unit (execution context) associated with such a program.

A logical execution unit is a specific processing unit that executes a program concurrently with other processing units, maintains a program execution state, and shares system resources with similar units within a primary processing unit.

One logical execution unit is supposed to run one execution thread (program) at a time. Therefore, for purposes of describing embodiments of the present invention there is no essential difference between the two terms. The methods described herein may be applicable to any processing system that may have performance monitoring resources shared between multiple processing units as well as multiple program threads as the latter are supported by hardware.

Hereinafter the term 'execution unit' denotes both an execution thread and a logical execution unit.

Figure 1:
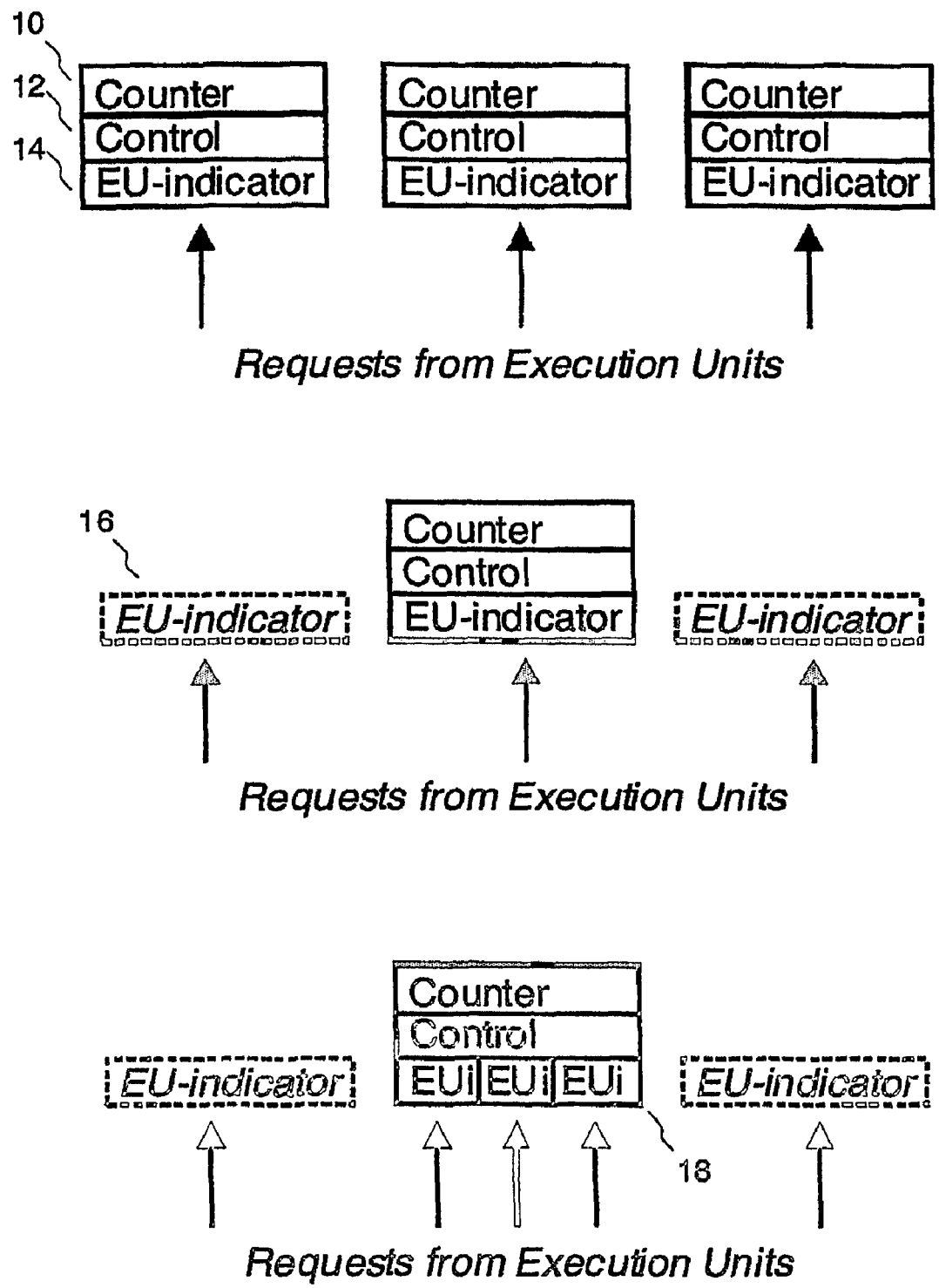
FIG. 1 is a diagram illustrating the dedication of hardware resources to execution threads according to an embodiment of the present invention.

FIG. 1 illustrates the structure of a performance monitoring unit (PMU) and three types of resource sharing that may occur in a symmetric multi-threading system. A PMU comprises counter logic 10, control logic 12, and execution unit indicator logic 14. In some embodiments, the execution unit indicator logic may be a part of the control logic. In a system that supports multiple execution units (EUs) within a physical package and provides each EU with a separate PMU for any given performance monitoring functionality, all performance monitoring data may be collected independently and asynchronously on an EU's demand. There are, however, a number of systems with limited PMU resources (e.g., Intel Corporation's Pentium4 processor with Hyper-Threading technology enabled) that need to be shared between multiple execution units. One of the examples of such sharing may be a system that has only one PMU that is capable of collecting performance data for either one or all execution units. The former case (one EU to be monitored) generally results in undercounting of performance data, while the latter case will produce overcounted results. To handle both cases, a system that implements the present invention needs to emulate the execution unit indicators 16 for each EU by means of a request allocation as described below.

Most of the current state-of-the-art systems provide a capability to set up a PMU to collect performance data for a subset of execution units by furnishing additional EU-indicators 18. Typically, the number of additional EU-indicators equals the number of execution units within a package, otherwise, if the number of EU-indicators appears to be less, the above described single EU-indicator conditions hold true for this case.

Figure 2:
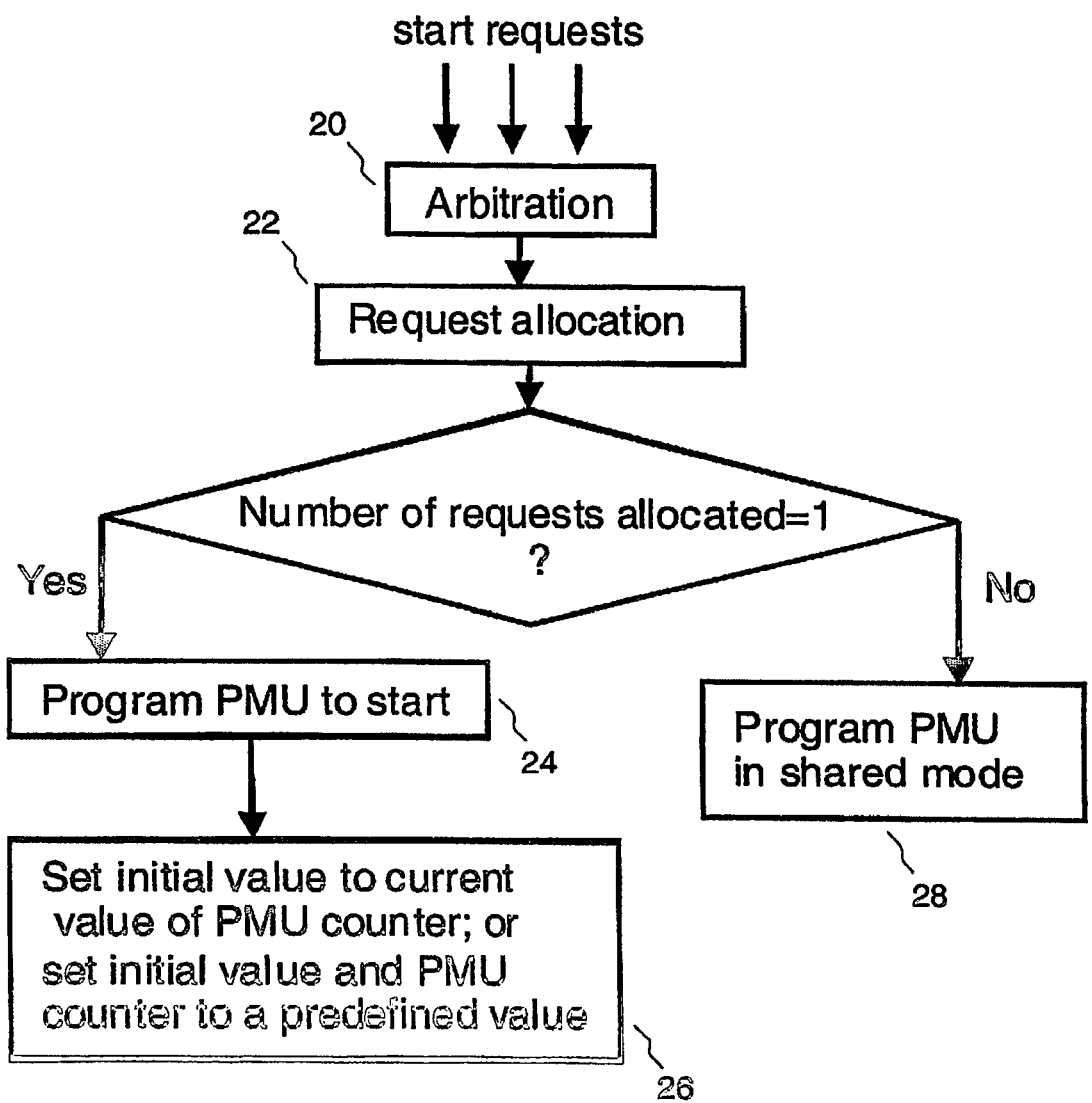
FIG. 2 is a flow diagram illustrating the initiation of the performance monitoring process according to an embodiment of the present invention.
Figure 3:
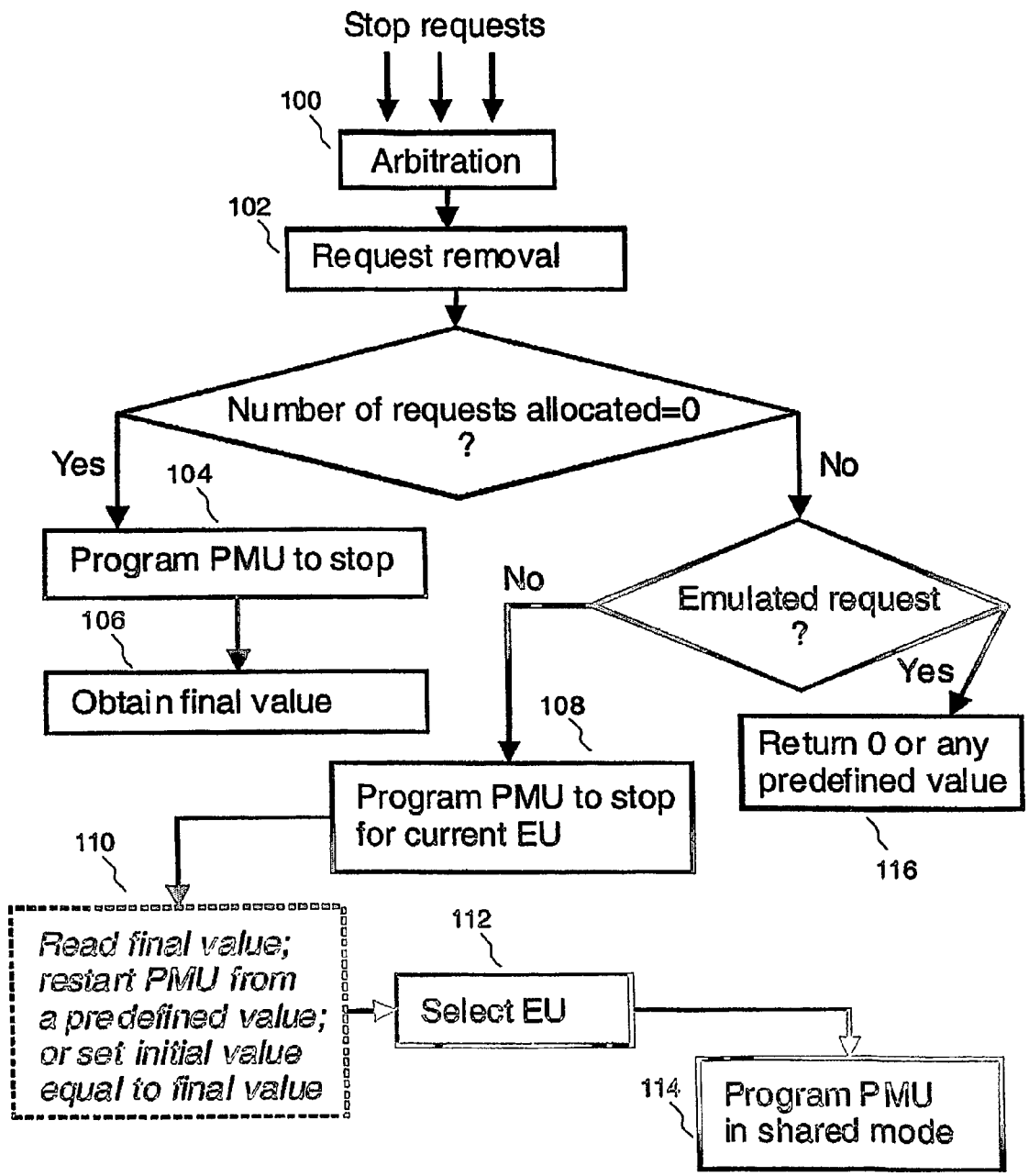
FIG. 3 is a flow diagram illustrating the completion of the performance monitoring operation according to an embodiment of the present invention.

The performance monitoring process is illustrated in FIGS. 2 and 3.

According to embodiments of the present invention, the performance monitoring is started or stopped upon a request from an execution unit. A system implementing the present method should be capable of maintaining the correct sequence of such requests, insuring that a stop request always follows a start request or establishing the start/stop correspondence in any other applicable manner, e.g., providing a nested request support or ignoring excessive requests. As the requests may appear simultaneously, a special arbitration step 20 may be used to guarantee the exclusive use of a PMU. Once exclusive execution is acquired, the start request is allocated at block 22, that is, a special table (provided for this purpose) or PMU (if supported by hardware) field may be filled with a value indicating that a request to start performance monitoring operation is pending for a specific execution unit. If there is only one request currently allocated, the PMU may be programmed at block 24 to start collecting performance monitoring data for the EU that allocated the request. At block 26, the PMU counter may be set to a predefined value if the hardware supports counter initialization; otherwise, the current counter value may be stored in a special memory area as an initial value and may be later subtracted from a final value when the performance monitoring operation stops. In case there is more than one request already allocated, at block 28 the requesting EU may be added to the set of EUs the PMU currently collects performance data for if such a possibility is supported by the PMU's hardware (PMU has a free EU-indicator).

Thus, performance monitoring process starts, and one counter of one PMU accumulates performance data for all execution units as they request this operation.

To stop the operation for an EU, a stop request may be issued by this execution unit. The arbitration may be performed at block 100 to acquire exclusive processing of each stop request. Then, at block 102, the stop request may be removed from the special table (see above) or PMU EU-indicator field (if supported by hardware). If there are no more requests allocated, the PMU may be programmed to stop collecting performance data at block 104. The final performance value may then be obtained at block 106. If there are requests from other EUs, active or pending, and the current EU belongs to the set of EUs the PMU collects data for (i.e., the request is active), the PMU may be programmed at block 108 to stop collecting data for the current EU (if such a possibility is supported by the PMU's hardware). Then, one skilled in the art will recognize the option, based on the knowledge of a particular system architecture and hardware performance monitoring capabilities, of retrieving the final performance value at block 110, setting the initial value equal to the value retrieved or reprogramming the performance monitoring unit to start counting from a predefined value if the retrieving and reprogramming procedures do not substantially affect performance monitoring results. Then, another EU needs to be selected at block 112 in order to be added to the set of EUs to accumulate data for at block 114. In case the current request is not within the set of active EUs (pending request, emulated by the EU-indicator 16), such a request may be discarded, and a zero or any predefined value may be returned as the performance monitoring result at block 116.

Thus, one embodiment of the present invention may be a system that collects performance monitoring data in one PMU counter for all execution units, and returns the performance monitoring results either each time all the EUs complete their operation, or each time a EU that happens to fall within a set of active EUs requests for completion. This means that the data collected pertains to all EUs and the total value is computed correctly (except for the described above cases of no hardware support for EU indicators) but the distribution of the final values to the EUs is considered system dependent. Still, even this implementation dependent information on the performance data distribution may be useful, because it reflects the real-time EU interaction features and may be useful for many other types of system performance analysis.

For an exemplary embodiment of the present invention implemented in Assembler language refer to Appendix A. The Assembler code is provided for the purpose of illustration only and does not constitute a complete software performance monitoring system. Furthermore, one skilled in the art will recognize that embodiments of the present invention may be implemented in other ways and using other programming languages.

The techniques described herein are not limited to any particular hardware or software configuration; they may find applicability in any computing or processing environment. The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

APPENDIX A

© 2002 Intel Corporation

A code example to count the number of bus accesses from a Pentium4 processor with Hyper-Threading technology enabled.

```
;;; a function to perform arbitration
syncHT proc near
    ;;; IN bh == Local APIC ID
    ;;; OUT eax -> spin lock flag
    movzx       eax,bh
    shr         eax,1
    lea         eax,[pml_sync_HT + eax]
    call        acquire_spin_lock
    ret
syncHT endp
;;; a function to start counting
busproc_restart proc near
    mov         eax,1
    cpuid
    shr         ebx,16
    or          bl,bl  ;;; no HT when zero
    jz          no_HT
    call        syncHT
    push        eax
```

-continued

```
;;; read ESCR
    xor         eax,eax
    xor         edx,edx
    mov         ecx,msr_fsb_escr0
    rdmsr
    test        bh,01h
    jnz         cpu1
;;; executing on logical CPU0
cpu0:
;;; if Tx clear, program own CCCR to start counting
    ;;; eax[3..2] == T0
    ;;; eax[1..0] == T1
    test        eax,03h
    jnz         T1set
    mov         ecx,msr_fsb_escr0
    mov         eax,busproc_escr_mask2 OR busproc_escr_T0
    wrmsr
    ;;; clear the counter
    mov         eax,pml_initial_count
    mov         edx, pml_initial_count + 4
    and         edx,0ffh ;;; 40-bit counters
    mov         ecx,msr_bpu_counter0
    wrmsr
    mov         ecx,msr_bpu_cccr0
    mov         eax,busproc_cccr_mask_PMI0
    wrmsr
    jmp         HT_exit
;;; else set T-own in ESCR
T1set:
    mov         ecx,msr_fsb_escr0
    or          eax,busproc_escr_mask2 OR busproc_escr_T0
    wrmsr
    jmp         HT_exit
;;; executing on logical CPU1
cpu1:
;;; if Tx clear, program own CCCR to start counting
    ;;; eax[3..2] == T0
    ;;; eax[1..0] == T1
    test        eax,0ch
    jnz         T0set
    mov         ecx,msr_fsb_escr0
    mov         eax,busproc_escr_mask2 OR busproc_escr_T1
    wrmsr
    ;;; clear the counter
    mov         eax,pml_initial_count
    mov         edx,pml_initial_count + 4
    and         edx,0ffh ;;;   40-bit counters
    mov         ecx,msr_bpu_counter1
    wrmsr
    mov         ecx,msr_bpu_cccr1
    mov         eax,busproc_cccr_mask_PMI1
    wrmsr
    jmp         HT_exit
;;; else set T-own in ESCR
T0set:
    mov         ecx,msr_fsb_escr0
    or          eax,busproc_escr_mask2 OR busproc_escr_T1
    wrmsr
HT_exit:
    pop         eax
    call        release_spin_lock
    ret
no_HT:
    mov         eax,pml_initial_count
    mov         edx,pml_initial_count + 4
    and         edx,0ffh ;;;   40-bit counters
    mov         ecx,msr_bpu_counter0
    wrmsr
    mov         ecx,msr_fsb_escr0
    mov         eax,busproc_escr_mask2 OR busproc_escr_T0
    wrmsr
    mov         ecx,msr_bpu_cccr0
    mov         eax,busproc_cccr_mask_PMI0
    wrmsr
    ret
```

```
busproc_restart endp
;;; a function to stop counting and retrieve final value
busproc_freeze_read proc near
    ;;; OUT edx:eax = current count
    mov       eax,1
    cpuid
    shr       ebx,16
    or        bl,bl ;;; no HT when zero
    jz        no_HT
    call      syncHT
    push      eax
;;; read ESCR
    xor       eax,eax
    xor       edx,edx
    mov       ecx,msr_fsb_escr0
    rdmsr
    test      bh,01h
    jnz       cpu1
;;; executing on logical CPU0
cpu0:
;;; if Tx clear, program own CCCR to stop counting
    ;;; eax[3..2] == T0
    ;;; eax[1..0] == T1
    test      eax,03h
    jnz       T1set
    ;;; stop counting
    mov       eax,busproc_cccr_stop_mask
    xor       edx,edx
    mov       ecx,msr_bpu_cccr0
    wrmsr
    ;;; clear ESCR
    mov       ecx,msr_fsb_escr0
    xor       eax,eax
    xor       edx,edx
    wrmsr
    ;;; read count into edx:eax
    mov       ecx,msr_bpu_counter0
    rdmsr
    jmp       HT_exit
;;; else
T1set:
;;; clear T-own in ESCR
    and       eax,NOT busproc_escr_T0
    mov       ecx,msr_fsb_escr0
    wrmsr
;;; read own CCCR
    mov       ecx,msr_bpu_cccr0
    rdmsr
    test      eax,cccr_enabled
    jz        disabled0
enabled0:
    ;;; program the other's CCCR
    mov       eax,pml_initial_count
    mov       edx,pml_initial_count + 4
    and       edx,0ffh ;;; 40-bit counters
    mov       ecx,msr_bpu_counter1
    wrmsr
    mov       ecx,msr_bpu_cccr1
    mov       eax,busproc_cccr_mask_PMI1
    wrmsr
    ;;; stop counting
    mov       eax,busproc_cccr_stop_mask
    xor       edx,edx
    mov       ecx,msr_bpu_cccr0
    wrmsr
    ;;; read count into edx:eax
    mov       ecx,msr_bpu_counter0
    rdmsr
    jmp       HT_exit
disabled0:
    ;;; return zero count
    xor       edx,edx
    xor       eax,eax
    jmp       4 HT_exit
;;; executing on logical CPU1
cpu1:
;;; if Tx clear, program own CCCR to stop counting
    ;;; eax[3..2] == T0
    ;;; eax[1..0] == T1
    test      eax,0ch
    jnz       T0set
    ;;; stop counting
    mov       eax,busproc_cccr_stop_mask
    xor       edx,edx
    mov       ecx,msr_bpu_cccr1
    wrmsr
    ;;; clear ESCR
    mov       ecx,msr_fsb_escr0
    xor       eax,eax
    xor       edx,edx
    wrmsr
    ;;; read count into edx:eax
    mov       ecx,msr_bpu_counter1
    rdmsr
    jmp       HT_exit
;;; else
T0set:
;;; clear T-own in ESCR
    and       eax,NOT busproc_escr_T1
    mov       ecx,msr_fsb_escr0
    wrmsr
;;; read own CCCR
    mov       ecx,msr_bpu_cccr1
    rdmsr
    test      eax,cccr_enabled
    jz        disabled1
enabled1:
    ;;; program the other's CCCR
    mov       eax,pml_initial_count
    mov       edx,pml_initial_count + 4
    and       edx,0ffh ;;; 40-bit counters
    mov       ecx,msr_bpu_counter0
    wrmsr
    mov       ecx,msr_bpu_cccr0
    mov       eax,busproc_cccr_mask_PMI0
    wrmsr
    ;;; stop counting
    mov       eax,busproc_cccr_stop_mask
    xor       edx,edx
    mov       ecx,msr_bpu_cccr1
    wrmsr
    ;;; read count into edx:eax
    mov       ecx,msr_bpu_counter1
    rdmsr
    jmp       HT_exit
disabled1:
    ;;; return zero count
    xor       edx,edx
    xor       eax,eax
HT_exit:
    xchg      eax,[esp]
    call      release_spin_lock
    pop       eax
    ret
no_HT:
    ;;; stop counting
    mov       eax,busproc_cccr_stop_mask
    xor       edx,edx
    mov       ecx,msr_bpu_cccr0
    wrmsr
    ;;; clear ESCR
    mov       ecx,msr_fsb_escr0
    xor       eax,eax
    xor       edx,edx
    wrmsr
    ;;; read count into edx:eax
    mov       ecx,msr_bpu_counter0
    rdmsr
    ret
busproc_freeze_read endp
```

What is claimed is:

1. In a system that shares a performance monitoring unit between multiple execution units, a method comprising:
receiving a request from a execution unit of the multiple execution units to start or stop performance monitoring operation of the execution unit;

maintaining a correct sequence of requests to start and stop performance monitoring operation by (i) ensuring each stop request corresponds to and follows a corresponding start request for the same execution unit and (ii) ignoring any stop request that does not follow a corresponding start request for the same execution unit;

performing arbitration to acquire exclusive execution for one of the multiple execution units based on predetermined criteria and in response to multiple requests to start and stop performance monitoring being received substantially simultaneously; and in response to receiving a request to start performance monitoring operation, (i) allocating a request to start performance monitoring operation based on the correct sequence of requests, (ii) determining a total number of allocated requests to start performance monitoring operation, and (iii) initiating performance monitoring operation; and in response to receiving a request to stop performance monitoring operation, (i) removing a request to start performance monitoring operation by indicating to the system that no request to start performance monitoring operation is pending for the current execution unit, (ii) determining an active mode of performance monitoring operation, and (iii) completing performance monitoring operation.

2. The method of claim 1, wherein allocating the request comprises indicating to the system that a request to start performance monitoring operation is pending for a specific execution unit.

3. The method of claim 1, wherein initiating performance monitoring operation comprises programming the performance monitoring unit to start collecting performance data for the execution unit that requested said operation if no other request was previously allocated.

4. The method of claim 3, further comprising at least one of setting an initial performance value to the current value of performance monitoring unit counter and setting the initial performance value and the performance monitoring unit counter to a predefined value.

5. The method of claim 1, wherein initiating performance monitoring operation further comprises programming the performance monitoring unit to start collecting performance data for the execution unit that requested said operation, in addition to collecting performance data of other execution units of the multiple execution units that previously requested said operation if there are other requests previously allocated.

6. The method of claim 1, wherein determining the active mode of performance monitoring operation comprises detecting whether programming of performance monitoring unit was performed for the execution unit that requested to stop performance monitoring operation.

7. The method of claim 1, wherein completing performance monitoring operation comprises retrieving final performance data and programming the performance monitoring unit to stop collecting of performance data if no other requests for the performance monitoring unit are allocated.

8. The method of claim 1, wherein completing performance monitoring operation further comprises programming the performance monitoring unit to stop collecting performance data for the execution unit that requested said operation in response to a stop request from the execution unit, if there are other requests previously allocated and the performance monitoring unit was in active mode for the execution unit.

9. The method of claim 8, further comprising retrieving current performance data, setting the initial performance value equal to the value retrieved or reprogramming the performance monitoring unit to start counting from a predefined value and setting the initial performance value equal to the predefined value.

10. The method of claim 8, further comprising: selecting another execution unit; programming the performance monitoring unit to start collecting performance data for the selected execution unit.

11. The method of claim 10, wherein selecting another execution unit comprises selecting, by external means, of a request previously allocated by another execution unit and determining the execution unit that allocated said request.

12. The method of claim 10, wherein programming the performance monitoring unit further comprises enabling performance data collection for the selected execution unit in addition to performance data of other execution units which previously requested said operation.

13. An article comprising: storage medium having a plurality of machine readable instructions, wherein when the instructions are executed by a processor, the instructions provide for sharing of a performance monitoring unit between multiple execution units by:

receiving a request from an execution unit of the multiple execution units to start or stop performance monitoring operation of the execution unit;

maintaining a correct sequence of requests to start and stop performance monitoring operation by (i) ensuring each stop request corresponds to and follows a corresponding start request for the same execution unit and (ii) ignoring any stop request that does not follow a corresponding start request for the same execution unit;

performing arbitration to acquire exclusive execution for one of the multiple execution units based on predetermined criteria and in response to multiple requests to start and stop performance monitoring being received substantially simultaneously; and in response to receiving a request to start performance monitoring operation, (i) allocating a request to start performance monitoring operation based on the correct sequence of requests, (ii) determining a total number of allocated requests to start performance monitoring operation, and (iii) initiating performance monitoring operation; and in response to receiving a request to stop performance monitoring operation, (i) removing a request to start performance monitoring operation by indicating to the system that no request to start performance monitoring operation is pending for the current execution unit, (ii) determining an active mode of performance monitoring operation, and (iii) completing performance monitoring operation.

14. The article of claim 13, wherein instructions for allocating the request comprise instructions for indicating to the system that a request to start performance monitoring operation is pending for a specific execution unit.

15. The article of claim 13, wherein instructions for initiating performance monitoring operation comprise instructions for programming the performance monitoring unit to start collecting performance data for the execution unit that requested said operation if no other request was previously allocated.

16. The article of claim 15, further comprising instructions for at least one of setting an initial performance value to the current value of a performance monitoring unit counter and setting the initial performance value and the performance monitoring unit counter to a predefined value.

17. The article of claim 13, wherein instructions for initiating of performance monitoring operation further comprise instructions for programming the performance monitoring unit to start collecting performance data for the execution unit that requested said operation, in addition to performance data of other execution units which previously requested said operation if there are other requests previously allocated.

18. The article of claim 13, wherein instructions for determining the active mode of performance monitoring operation comprise instructions for detecting whether programming of performance monitoring unit was performed for the execution unit that requested to stop performance monitoring operation.

19. The article of claim 13, wherein instructions for completing performance monitoring operation comprise instructions for retrieving final performance data and programming the performance monitoring unit to stop collecting of performance data if no other requests for the performance monitoring unit are allocated.

20. The article of claim 13, wherein instructions for completing performance monitoring operation further comprise instructions for programming the performance monitoring unit to stop collecting of performance data for the execution unit that requested said operation in response to a stop request from the execution unit, if there are other requests previously allocated and the performance monitoring unit was in active mode for the current execution unit.

21. The article of claim 20, further comprising instructions for retrieving current performance data, setting the initial performance value equal to the value retrieved or reprogramming performance monitoring unit to start counting from a predefined value and setting the initial performance value equal to the predefined value.

22. The article of claim 20, further comprising instructions for: selecting another execution unit; programming the performance monitoring unit to start collecting of performance data for the selected execution unit.

23. The article of claim 22, wherein instructions for selecting another execution unit comprise instructions for selecting, by external means, of a request previously allocated by another execution unit and determining the execution unit that allocated said request.

24. The article of claim 22, wherein instructions for programming the performance monitoring unit further comprise instructions for enabling performance data collection for the selected execution unit in addition to performance data of other execution units which previously requested said operation.

25. A system that shares a performance monitoring unit between multiple execution units comprising:
   a processor; and
   a memory device communicatively coupled to the processor, the memory device having stored therein a plurality of instructions that, when executed by the processor, cause the processor to:
   receive a request from an execution unit of the multiple execution units to start or stop performance monitoring operation of the execution unit;
   maintain a correct sequence of requests to start or stop performance monitoring operation by (i) ensuring each stop request corresponds to and follows a corresponding start request for the same execution unit and (ii) ignoring any stop request that does not follow a corresponding start request for the same execution unit;
   perform arbitration to acquire exclusive execution for one of the multiple execution units based on predetermined criteria and in response to multiple requests to start and stop performance monitoring being received substantially simultaneously; and
   in response to receiving a request to start performance monitoring operation, (i) allocate a request to start performance monitoring operation based on the correct sequence of requests, (ii) determine a total number of allocated requests to start performance monitoring operation, and (iii) initiate performance monitoring operation; and
   in response to receiving a request to stop performance monitoring operation, (i) remove a request to start performance monitoring operation by indicating to the system that no request to start performance monitoring operation is pending for the current execution unit, (ii) determine an active mode of performance monitoring operation, and (iii) complete performance monitoring operation.

26. The system of claim 25, wherein to allocate the request comprises to indicate to the system that a request to start performance monitoring operation is pending for a specific execution unit.

27. The system of claim 25, wherein to initiate performance monitoring operation comprises to program the performance monitoring unit to start collecting performance data for the execution unit that requested said operation if no other request was previously allocated.

28. The system of claim 27, further comprising to at least one of set an initial performance value to the current value of a performance monitoring unit counter and set the initial performance value and the performance monitoring unit counter to a predefined value.

29. The system of claim 25, wherein to initiate performance monitoring operation further comprises to program the performance monitoring unit to start collecting performance data for the execution unit that requested said operation, in addition to performance data of other execution units which previously requested said operation if there are other requests previously allocated.

30. The system of claim 25, wherein to determine the active mode of performance monitoring operation comprises to detect whether programming of performance monitoring unit was performed for the execution unit that requested to stop performance monitoring operation.

31. The system of claim 25, wherein to complete performance monitoring operation comprises to retrieve final performance data and to program the performance monitoring unit to stop collecting of performance data if no other requests for the performance monitoring unit are allocated.

32. The system of claim 25, wherein to complete performance monitoring operation further comprises to program the performance monitoring unit to stop collecting performance data for the execution unit that requested said operation in response to a stop request from the execution unit, if there are other requests previously allocated and the performance monitoring unit was in the active mode for the current execution unit.

33. The system of claim 32, wherein the plurality of instruction further cause the processor to retrieve current performance data, to set the initial performance value equal to the value retrieved or to reprogram performance monitoring unit to start counting from a predefined value and set the initial performance value equal to the predefined value.

34. The system of claim 32, wherein the plurality of instruction further cause the processor to select another execution unit and to program the performance monitoring unit to start collecting performance data for the selected execution unit.

35. The system of claim 34, wherein to select another execution unit comprises to select, by external means, a request previously allocated by another execution unit and to determine the execution unit that allocated said request.

36. The system of claim 34, wherein to program the performance monitoring unit further comprises to enable performance data collection for the selected execution unit in addition to performance data of other execution units which previously requested said operation.

* * * * *